United States Patent [19]

Galan Inchaurbe

[11] Patent Number: 4,789,264
[45] Date of Patent: Dec. 6, 1988

[54] PIPE SOCKET CONNECTION FOR A SPACIAL STRUCTURE

[76] Inventor: Jose M. J. Galan Inchaurbe, Estrada Masustegui, 4, Bilbao, Spain

[21] Appl. No.: 910,202

[22] Filed: Sep. 22, 1986

[51] Int. Cl.⁴ .......................... B25G 3/00; F16D 1/00
[52] U.S. Cl. .......................................... 403/8; 403/19; 403/171
[58] Field of Search .................. 403/8, 21, 22, 171, 403/176, 172, 7, 19

[56] References Cited

U.S. PATENT DOCUMENTS

| | | | |
|---|---|---|---|
| 2,361,706 | 10/1944 | Pavlecka et al. | 403/21 |
| 3,982,841 | 9/1976 | Endzweig. | |
| 3,995,962 | 12/1976 | Mylaeus | 403/171 X |
| 4,371,279 | 2/1983 | Prussen | 403/21 X |
| 4,664,550 | 5/1987 | Jachmann | 403/171 |

FOREIGN PATENT DOCUMENTS

| | | | |
|---|---|---|---|
| 2246478 | 4/1973 | Fed. Rep. of Germany | 403/171 |
| 2736635 | 10/1978 | Fed. Rep. of Germany | 403/171 |
| 539924 | 2/1956 | Italy | 403/171 |
| 715735 | 12/1980 | U.S.S.R. | 403/171 |

Primary Examiner—Andrew V. Kundrat
Attorney, Agent, or Firm—Lucas & Just

[57] ABSTRACT

A pipe and socket connection for a spacial structure which is comprised of a pipe termination that is coaxial and welded to the end of the pipe and which possesses a hole in which a screw is able freely to rotate, the diameter of the screw head being greater than that of the hole in which it can rotate, a polygonally sectioned body and a threaded end, and where a nut having a polygonal inside shape engages upon the body of said screw, and where means are provided to restrict unwanted axial motion of the screw.

4 Claims, 2 Drawing Sheets

PIPE SOCKET CONNECTION FOR A SPACIAL STRUCTURE

SUMMARY OF THE INVENTION

This invention is concerned with a pipe and socket connection for a spacial structure which is characterized because it is comprised of:

(a) A pipe termination that is coaxial and welded to the end of the pipe, and which possesses a hole arranged to allow free rotation within of:

(b) a screw that is comprised of:

($b_1$) a head whose diameter is greater than that of the hole in which it can revolve.

($b_2$) a polygonally sectioned body.

($b_3$) a threaded end;

(c) a nut whose inside shape is polygonal, which is engaged upon the body of the screw;

(d) means for restricting unwanted axial travel of the screw.

It is moreover characterized because the means for restricting the unwanted axial travel of the screw are comprised of:

(a) a housing that is welded to the pipe termination and which covers the head of the screw;

(b) A flexible lip formed by cutting and shaping the actual housing, and arranged to abut with the head of the screw.

DESCRIPTION OF THE PREFERRED EMBODIMENTS

Figure 1:
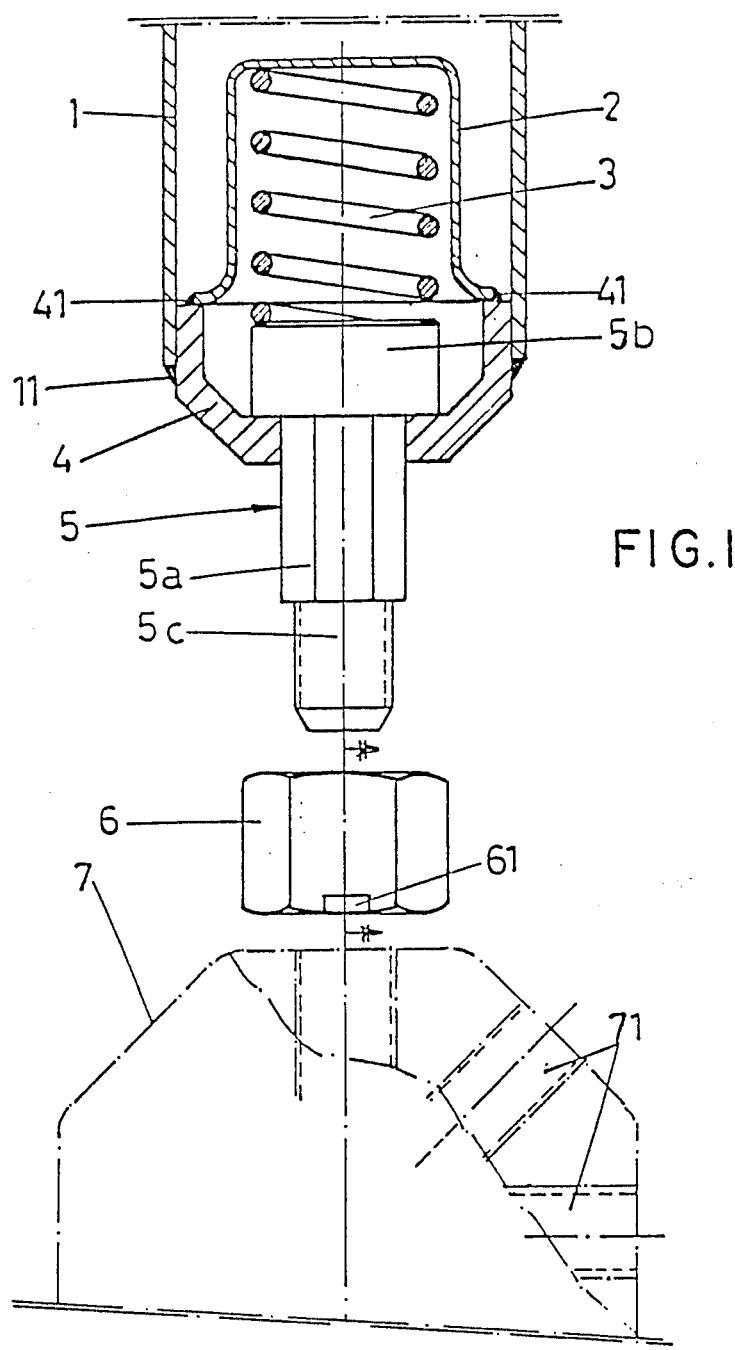
FIG. 1 is a general elevational view of a construction of the connection between parts in accordance with the invention, where all component parts are shown in the disassembled position.

Said FIG. 1 shows:

the tubular component (1), the pierced pipe termination (4) welded thereto, the housing (2) and spring (3) in section;

the socket (7) in dotted lines as a partial view, and also a section cut away to reveal threaded holes (71).

Also visible are:

a screw (5), a nut (6).

Screw (5) is comprised of:

(a) a head (5b)

(b) a body (5a) which is polygonally shaped, (c) a thread end portion (5c).

Nut (6) has a polygonal inside shape which mates with shape (5a) on screw (5). On at least one of the outside faces, there is provided a slot (61) by means of which nut (6) is able to travel axially upon the screw (5), upon whose portion (5a) it is accommodated without rotating.

The assembly thus described comprises the means for assembling/disassembling the improved arrangement for connecting components together as covered by this invention.

The means for positioning said screw (5) upon said tubular component (1) are:

a pierced head (4), in whose hole, screw (5) is accommodated, and which is welded at (11) to the tubular component (1);

an enclosed housing, which is welded at (41) to said pierced head (4);

a spring (3) which abuts against head (5b) on screw (5), and against the base of said housing (2) to position screw (5) so that its accidental axial travel is restricted.

Component (7) possesses at least one threaded hole (71).

Slot (61) providing access to the screw assists in total disassembly, because screw (5) can be moved backwards further, and thus made to compress spring (3).

It will be understood that a lip on housing (2) arranged to rest flexibly upon screw head (5b) will perform the same function as the spring (3).

Figure 2:
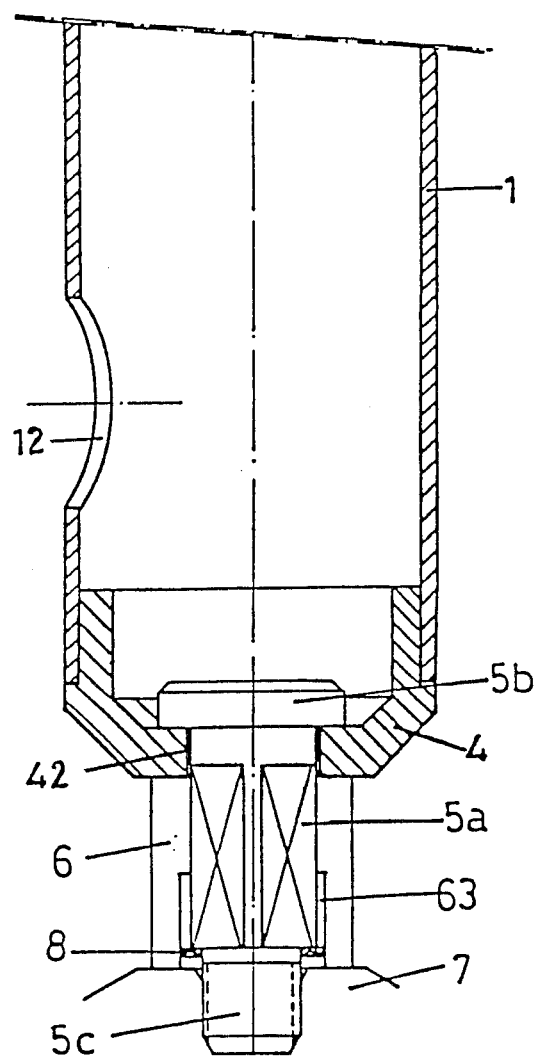
FIG. 2 depicts a general elevational view of a construction of the connection in accordance with the invention with the nut in assembled position.
Figure 3:
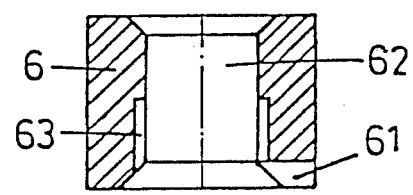
FIG. 3 is a cross-section view of nut (6) in FIG. 2.

In FIG. 2, nut (6) also defines a recess (63) inside one of its end faces, this being that which is capable of being positioned opposite the socket (7), Screw (5) is assembled upon pierced head (4) by being inserted into hole (12) until it becomes housed inside hole (42) of same, with body (5a), (5c) protruding outside and head (5b) enclosed inside.

Subsequently, nut (6) is applied to the screw (5) and their polygonal areas (5a), (62) made to lie together, and it is restrained to prevent unwanted axial travel by means of a spring washer (8) which is assembled upon bolt (5) and accommodated inside recess (63).

The operation in this FIG. 2 is as follows:

(a) once the nut (6) is assembled upon the screw (5), this latter is offered to hole (71) in component (7) to which it is intended to be connected. Nut (6) is rotated to make screw (5) rotate and thus advance by engagement with threads inside hole (71) as far as the stop, this being the assembled position;

(b) rotation in the opposite direction is effected, whereupon the screw returns and becomes disengaged from the hole (71), this being the disassembled position. The slot (61) assists with total disassembly, because by means of this access, screw (5) can be made to move further without nut (6) returning and with washer (8) travelling along this distance.

I claim:

1. A pipe and socket connection for spatial structures comprising:

(a) a pipe termination that is coaxial with and welded to one end of the pipe, said pipe termination having a hole therein;

(b) a screw that is freely rotatable in said hole of said pipe termination, said screw comprising:

($b_1$) a head having a diameter greater than said hole of said pipe termination, said head positioned inside said pipe;

($b_2$) a polygonal body connected to said head and extending through said hole to outside said pipe; and ($b_3$) a threaded end connected to said polygonal body;

(c) a nut having an inside polygonal area that mates with said polygonal body of said screw, said nut having an inside recess therein; and (d) a spring washer positioned in said inside recess of said nut to restrict axial movement of said screw.

2. The pipe and socket connection of claim 1 wherein said nut has a slot therein that extends from outside said nut to said inside polygonal area thereof.

3. The pipe and socket connection of claim 1 wherein said pipe has a hole in a wall of said pipe to allow for insertion of said screw.

4. The pipe and socket connection of claim 3 wherein said nut has a slot therein that extends from outside said nut to said inside polygonal area thereof.

* * * * *